Figure 1:
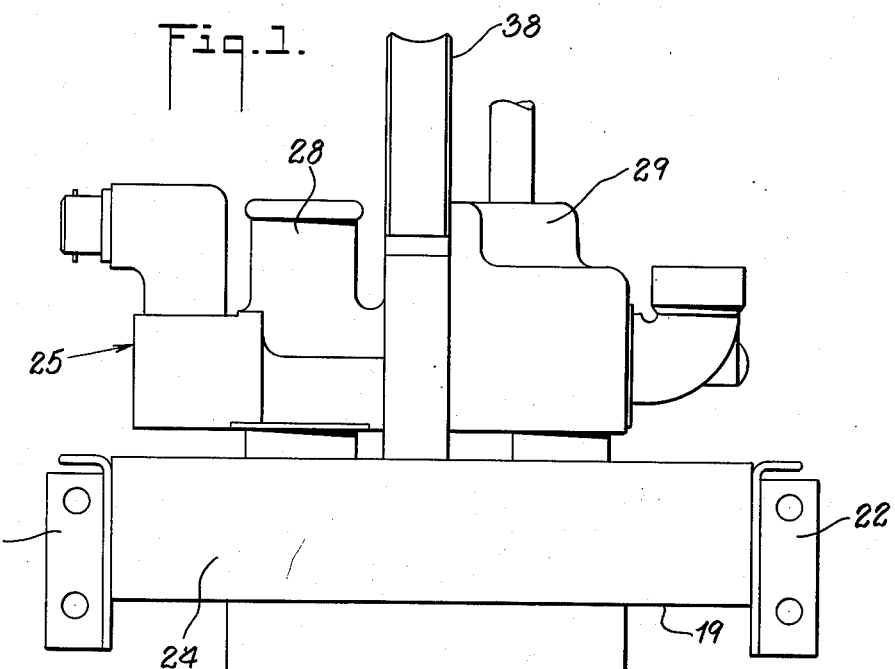

July 4, 1961

J. V. OLIVEAU 2,990,596

DISCONNECT FOR THE SUPPLY LINES FROM AN AIRCRAFT TO A PILOT

Filed Oct. 3, 1956

3 Sheets-Sheet 1

INVENTOR.
JOHN V. OLIVEAU

BY
Benj. T. Rauber
ATTORNEY

July 4, 1961  J. V. OLIVEAU  2,990,596
DISCONNECT FOR THE SUPPLY LINES FROM
AN AIRCRAFT TO A PILOT
Filed Oct. 3, 1956  3 Sheets-Sheet 2
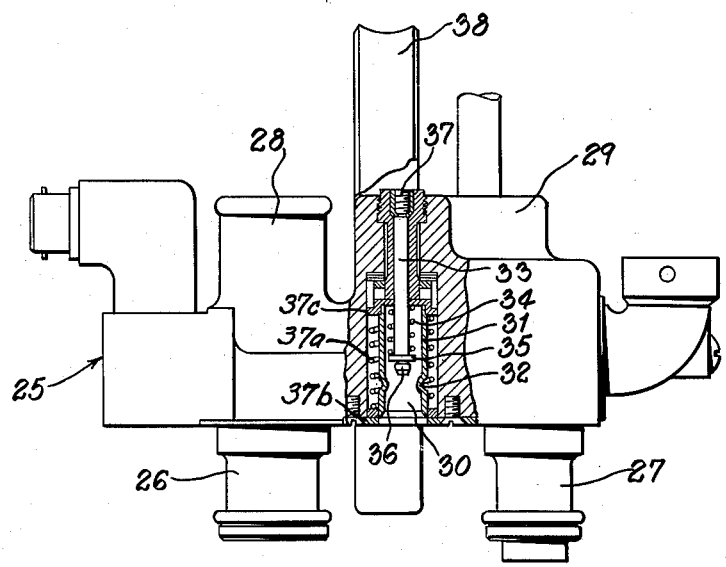
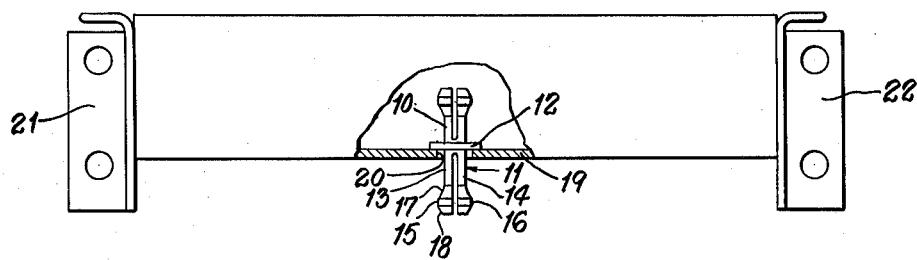
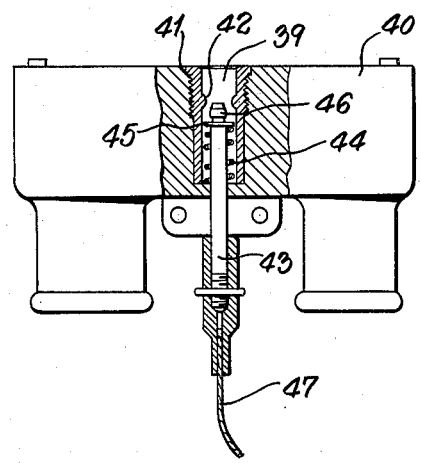
INVENTOR.
JOHN V. OLIVEAU
BY
*Benj. T. Rauber*
ATTORNEY

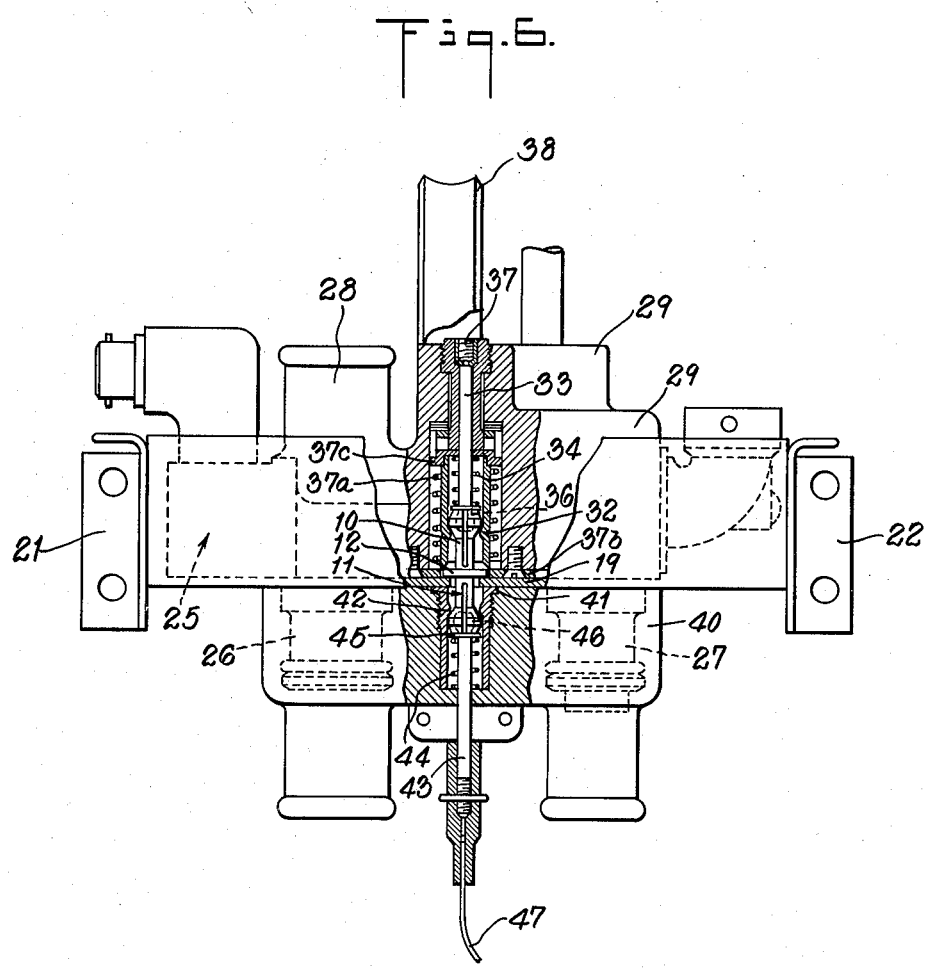

United States Patent Office 2,990,596
Patented July 4, 1961

2,990,596
DISCONNECT FOR THE SUPPLY LINES FROM AN AIRCRAFT TO A PILOT
John V. Oliveau, Greenwich, Conn., assignor to Aerotec Industries, Inc., a corporation of Connecticut
Filed Oct. 3, 1956, Ser. No. 613,728
5 Claims. (Cl. 24—211)

My invention relates to improvements in the disconnects between the supply and electric lines of aircraft and the pilot.

In aircraft, particularly in aircraft flying at high altitudes, the pilot is supplied from the aircraft supply with oxygen for breathing and air under pressure for pressurizing his suit and is also connected with the electric and signaling system of the aircraft.

The disconnect consists of three separable components. One of these is an upper part referred to as the pilot end which becomes a part of the pilot's personal equipment as soon as he puts on his flight equipment and which remains with him. The second is known as the aircraft end and carries the flexible supply lines and wires and is loosely mounted inside the cockpit. The third part is a bracket permanently fixed to the side of the pilot's seat and is intermediate the pilot end and the aircraft end.

When assembled for flight the lowermost part or aircraft end is joined and secured to the bracket but must be separable therefrom when the pilot bails out in an emergency. The uppermost or pilot end is detachable from the bracket and aircraft end so that the pilot may disconnect it when leaving the aircraft. When he enters the aircraft and is seated on the seat he attaches the pilot end preparatory to flight. All of the supply and electric lines are then in readiness for use. If and when it should be necessary for the pilot to bail out in flight, the seat is ejected with the pilot and it is necessary for the lower part or aircraft end, which remains with the aircraft, to be disconnected automatically from the pilot end and bracket. Within a few seconds after the pilot has been ejected the seat is separated from the pilot by automatic release of a lap belt and the upper part or pilot end separates from the bracket.

In my present invention the disconnect is provided with a locking means comprising a disc to seat on the upper surface of the bracket and a split pin extending downwardly from the disc through a hole in the bracket to be received and locked in a recess or socket of the lower part or aircraft end and having a restricted opening. The aircraft end is thereby held in position on the under side of the bracket, the bracket being held between the disc and the lower part. A similar split pin extends upwardly from the disc to be received in a downwardly opening recess or socket with a restricted opening in the upper part. The downwardly extending pin has a head which is contracted by inwardly bending the halves of the split pin to permit it to pass downwardly through the restricted opening in the socket of the lower part and then expand to hold the lower part in position. The pin and head are then prevented from contracting to release the lower part by means of a bolt spring pressed to enter the head as it passes below the restricted opening in the lower part socket thus locking the pin in this part. The bolt is attached to the aircraft by a lanyard which permits limited movement of the seat but which pulls the bolt free of the split pin when the seat and pilot are ejected and which then pulls the lower part free from the supporting plate, collapsing the split pin. This automatically frees the pilot and seat from the lower part which remains in the aircraft. When the pilot separates from the seat the lower pin is pulled upwardly through the hole in the bracket.

The coupling of the upwardly extending split pin in the upper part is similar except that the bolt is not attached to a lanyard. The socket has a slidable thimble carrying the restricted opening and spring pressed inwardly so that upon pulling the upper part including the bolt upwardly the thimble is displaced relatively against the action of its spring until the pin is free of the end of the bolt and can be collapsed and drawn through the restricted opening and the upper part freed from the lower part and supporting plate. This enables the pilot to disconnect the upper part by merely pulling it upwardly as he leaves his seat, the lower part remaining locked to the bracket and seat. When the pilot enters the aircraft and is seated preparatory to flight is is necessary merely to press the upper part downwardly into place, the upwardly extending split pin passing through the restricted opening and displacing the locking bolt upwardly against a spring until the head of the pin clears the opening whereupon the bolt is pressed by the spring into the pin locking it in position. This enables the pilot to attach and detach the upper part before and after a flight without moving the lower part.

Figure 2:
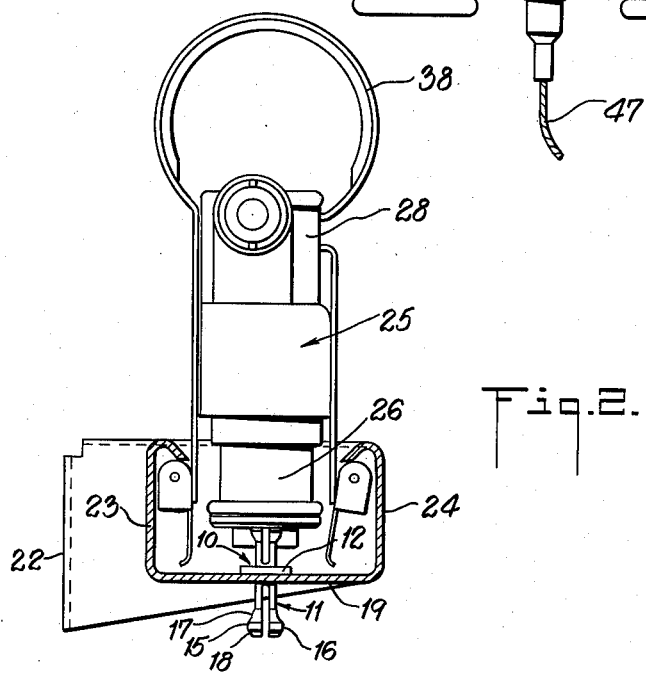

The various features of my invention are illustrated by way of example in the accompanying drawings, in which:

FIG. 1 is a side view of an assembled disconnect embodying the invention,

FIG. 2 is an end view of the upper part of the disconnect and a part attached to the seat in position as the disconnect part is separating from the seat part, FIG. 3 is a side elevation of the upper part of the disconnect, part being broken away to show the interior construction, FIG. 4 is a side elevation of a part of the seat element positioned between the upper and lower parts, a part being shown broken away, and, FIG. 5 is a side elevation of the lower part of the disconnect, a part being broken away, and FIG. 6 is a front elevation of the assembled elements, parts being in section as in FIGS. 3–5.

In the embodiment shown, a pair of compressible pins 10 and 11 are shown in FIG. 4 mounted on a disc 12, one pin, 10, extending upwardly from the disc 12 and the other pin, 11, extending downwardly therefrom. Each pin comprises a pair of spaced spring arms 13 and 14 parallel to each other and enlarged outwardly at their free ends as at 15 and 16, respectively, to form a head for the pin. Each of the enlargements is bevelled upwardly as at 17 and downwardly as at 18 to provide cam surfaces of conical curvature so that the arms of the pins will spring toward each other when the head of the pin is moved longitudinally through a passage of less diameter than that of the pin in its normal expanded position.

As shown in FIG. 4 the disc 12 rests on the upper surface of a plate 19 attached to the aircraft seat, the lower pin 11 passing through an opening 20 in the plate. As shown in FIG. 4, the plate 19 is attached to the seat by means of brackets 21 and 22 at its opposite ends and is extended at each side in walls 23 and 24 between which the upper part of the disconnect is received.

An upper part 25 of the disconnect, shown by way of example with downwardly extending nozzles 26 and 27 for air and oxygen to connect with the lower part and with delivery nozzles 28 and 29 to connect with the supply lines to the pilot, is provided with a recess 30 extending upwardly from its lower surface to receive the upper pin 10 of the pin element. The recess is formed with a cylindrical thimble 31 the diameter of which is sufficient to receive the head of the upper pin with a sliding fit without compressing the pin. At a short distance from its lower, open end the thimble 31 is contracted to a neck portion 32 of a diameter that will permit the passage of the head of the pin therethrough only when the pin has been contracted inwardly. When the pin 10 is pushed upwardly into the thimble, therefore, it contracts to pass through the neck opening and after passing through expands thereabove. It can be pulled out only when it is free to contract.

When the contracted head of the pin 10 passes through the neck opening 32 it contacts the lower end of a vertically slidable locking bolt 33 and pushes it upwardly against the pressure of a spring 34 confined between the inner end of the thimble and a flange 35 on the locking pin. After the head has passed through the neck 32 it expands sufficiently to permit the tip 36 of the locking bolt to be pressed by the spring 34 between the parallel spring arms of the pin and thus prevent the pin from being collapsed. The bolt 33 is held from downward movement by a head 37 in a recess in the upper part. Once the pin 10 has been fully inserted it cannot be withdrawn until the thimble 31 and opening 32 have been displaced downwardly relative to the bolt to free the arms of the pin. The thimble is normally held in its uppermost position in the socket by means of a spring 37ª confined between a flange 37ᵇ fixed on the upper part and a flange 37ᶜ fixed on and movable with the thimble. The upper part 25 may be drawn upwardly by a handle 38, while the thimble 31 is held by the pin 10 until the pin clears the tip 36 of the bolt whereupon it contracts and slips through the neck 32. The thimble 31 is then pressed by the spring 37ª to its uppermost position in the socket.

The pin 11 may be similarly inserted into a socket 39 extending downwardly into a lower part 40. The socket 39 is formed with a thimble 41 fixed therein and having a contracted neck 42, and a slidable locking bolt 43 pressed upwardly by a spring 44 confined between the bottom of the socket and a flange 45 on the bolt. When the pin 11 is inserted into the socket 39 it displaces the bolt 43 downwardly until its head is below the neck opening 42. Then it expands and permits the tip 46 of the bolt to enter between the spring arms of the pin 11 and the pin is locked from being withdrawn.

The bolt 43 is connected by a lanyard 47 to the aircraft so that when the seat is ejected with the pilot on bailing out, the lanyard 47 first pulls the bolt 43 out of the latching pin 11 so that on further movement of the seat the pin 11 may be pulled free from the socket 39 and the upper part 25 will separate from the lower part 40. The pin 11 is held from moving downwardly with the lower part 40 by the disc 12 which cannot pass through the opening 20. However it can move upwardly when the pilot releases the seat and separates from it, the pins 10 and 11 and plate 12 being locked to the upper part 25 carried by the pilot.

The operation of the apparatus is briefly as follows:

Normally the pins 10 and 11 are held on the bracket plate 19 as the pin 11 is in position in the socket 39 with its head 15 below the constricted opening 42 and held from collapsing inwardly by the tip 46 of the bolt 43. The pilot may then take his position in the aircraft seat and connect the upper part by merely pressing it downwardly with the pin 10 aligned with the thimble 31 which is fixed against upward movement in the part 25. The pin 10 then collapses to pass through the restricted neck opening 32, pressing the bolt 33 upwardly against the spring 34 until the head of the pin clears the opening 32 and expands, whereupon the bolt 33 is pressed downwardly by the spring 34 into the pin and preventing its withdrawal. Both parts are then locked in position on opposite sides of the bracket plate 19. When the normal flight is completed the pilot may disconnect the upper part by merely pulling it upwardly by means of the handle 38 whereupon the thimble 31 is pulled relatively downwardly by the engagement of the head of the pin 10 in the opening 32 against the action of the spring 37ª, the bolt 33 being held by its head 37 against downward movement. When the head of the pin 10 is free of the end of the bolt 33, it collapses and passes through the opening 32 and the upper part is free and may be removed as it is a part of the pilot's equipment.

The lanyard 47 is of sufficient length to permit limited movement or adjustment of the seat. In the event of an emergency when the pilot and seat are ejected beyond this limit of movement the lanyard being fixed to the aircraft pulls the bolt 43 downwardly from the pin 11 so that this pin may collapse and pass free of the opening 42. The lower part 40 then falls to the floor of the aircraft. This is automatic with the ejection and requires no attention by the pilot, whose attention may be directed to other matters connected with the emergency. The pilot is then freed from the seat and the pin 11 passes freely upwardly through the hole 20 in the plate 19 and the disconnect is free of the seat without the need of any action by the pilot. The pins 10 and 11 and disc 12 remain locked to the upper part 25.

Having described my invention, what I claim is:

1. A disconnect for aircraft which comprises a securing means having a pair of split pins extending in opposite directions, each split pin comprising a pair of spaced parallel spring arms enlarged radially outwardly at their free ends to form a head, an upper disconnect part having a recess extending upwardly from its bottom and narrowed to a neck passage near its lower, open, end to receive the head of one of said split pins only when contracted by springing its arms inwardly and to permit said pin to expand after passing through said neck passage, a lower disconnect part having a downwardly opening recess narrowed near its upper, open, end to a neck passage to receive the head of the other of said pins only when contracted and to permit said other pin to expand after passing through said neck passage and a locking bolt for each pin slidable longitudinally in its respective recess to bring its tip alternatively between and out of the space between the arms of its respective pin and a spring in each said recess biasing the locking bolt in its recess outwardly toward said neck passage to press the tip of the locking bolt between the spaced arms of its respective pin said locking bolts being aligned and extending through their respective disconnect parts and attachment means secured to the extending parts of said locking bolts whereby a direct pull on each said locking bolt will withdraw it from the split pin in which it projects, compress the spring and withdraw the split pin from the recess.

2. The disconnect of claim 3 having a disc integrally mounted transversely between the split pins, and a plate for attachment to a bracket between said disc and the lower of said split pins and having an opening through which the lower split pin extends.

3. A disconnect for supply and communications from an aircraft to a pilot which comprises a mounting plate provided with an opening, a fastening element comprising a disc resting on said mounting plate and having a pair of spaced spring elements extending downwardly through said opening and enlarged outwardly at their lower ends to form a downwardly extending split pin with a head at its lower end and a pair of spaced spring elements extending upwardly and enlarged outwardly at their upper ends to form an upwardly extending split pin with a head at its upper end, a lower connecting disconnect part to be detachably secured to the under face of said mounting plate and having a downwardly extending recess narrowed near its upper part to a neck opening which permits the passage of the head of said downwardly extending split pin when said downwardly extending spring elements of said split pin are deflected toward each other and to engage and hold said head after said head has passed through said neck opening and having a lower locking bolt slidable upwardly in said recess to enter between said spaced spring elements to hold said pin from contracting and a spring biasing said bolt upwardly, and an upper disconnect part to be detachably mounted on the upper face of said mounting plate and having an upwardly extending recess to receive said upwardly extending split pin and narrowed near its lower part to a neck opening which permits the passage therethrough of the head of the upwardly extending split pin when the spring elements of the upwardly extending split pin are deflected toward each other and to engage and hold said head after said head has passed through said neck opening and having an upper locking bolt slidable downwardly in said recess to enter between said spaced spring elements to hold said split pin from contracting and a spring biasing said upper locking bolt downwardly, said upper locking bolt extending to the upper surface of said disconnect and having a handle to enable said upper locking bolt to be pulled upwardly, compressing said spring to withdraw said bolt from said split pin and to withdraw said upper disconnect part from said mounting plate and said lower disconnect part, and said lower locking pin extending through the lower disconnect part and having a lanyard to enable said lower locking pin to be withdrawn from said split pin, to compress its spring and withdraw said lower disconnect part from said split pin and said mounting plate.

4. The disconnect of claim 5 in which the upwardly extending recess of said upper disconnect part comprises a vertically slidable thimble carrying the neck opening and a spring biasing said thimble to its uppermost position and permitting it to slide downwardly until the split pin is withdrawn from said locking bolt.

5. The disconnect of claim 6 in which said upper locking bolt has a head engaging the upper disconnect part to limit its downward movement.

References Cited in the file of this patent

UNITED STATES PATENTS

| | | |
|---|---|---|
| 809,883 | Zeckhauser | Jan. 9, 1906 |
| 867,929 | Stiles | Oct. 8, 1907 |
| 941,096 | Mannes | Nov. 23, 1909 |
| 1,647,780 | Carr | Nov. 1, 1927 |
| 1,675,790 | Carr | July 3, 1928 |
| 2,302,707 | Mejean | Nov. 24, 1942 |
| 2,482,292 | Sabbia | Sept. 20, 1949 |
| 2,494,005 | Sabbia | Jan. 10, 1950 |
| 2,602,608 | Darling | July 8, 1952 |
| 2,621,875 | Darling | Dec. 16, 1952 |
| 2,859,422 | Oliveau | Nov. 4, 1958 |

FOREIGN PATENTS

| | | |
|---|---|---|
| 677,438 | Germany | June 26, 1939 |